US007618078B2

(12) United States Patent
Gerner

(10) Patent No.: US 7,618,078 B2

(45) Date of Patent: Nov. 17, 2009

(54) FUEL FLAP FOR AUTOMOBILES

(75) Inventor: Robert Gerner, Bad Mergentheim (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 0 days.

(21) Appl. No.: 11/688,713

(22) Filed: Mar. 20, 2007

(65) Prior Publication Data

US 2007/0251055 A1 Nov. 1, 2007

(30) Foreign Application Priority Data

Apr. 28, 2006 (DE) ...................... 10 2006 019 959

(51) Int. Cl.
*B60K 15/05* (2006.01)

(52) U.S. Cl. ............ 296/97.22; 220/86.2; 220/DIG. 33

(58) Field of Classification Search ............. 296/97.22; 220/86.2, DIG. 33
See application file for complete search history.

(56) References Cited

U.S. PATENT DOCUMENTS 5,664,811 A 9/1997 Martus et al.
6,702,357 B2 * 3/2004 Joerg et al. ............... 296/97.22

FOREIGN PATENT DOCUMENTS

DE 19957967 A1 6/2001
DE 10026841 A1 12/2001
DE 20311149 U1 11/2003
EP 1574381 A2 9/2005
JP 2005075112 A 3/2005

OTHER PUBLICATIONS

EP Search Report of EP Application No. EP 07 00 0407 Mailed Oct. 25, 2007.

* cited by examiner

*Primary Examiner*—Glenn Dayoan
*Assistant Examiner*—Melissa A Black
(74) *Attorney, Agent, or Firm*—Lowe Hauptman Ham & Berner LLP

(57) ABSTRACT

In a fuel flap, a first fastening element is attached to a hinge arm. The hinge arm has a second fastening element co-acting with the first fastening element in order to attach the fuel flap to the hinge arm at a predetermined position. The first fastening element includes at least two approximately parallel fastening ribs, at least one of the ribs having two spaced holes and the other has at least one hole, with the axes of the holes being parallel. The second fastening element includes at least three projections having a cross-section complementary to that of the holes. A resilient portion is formed to the hinge arm which upon engagement of the projection in holes is temporarily deformed and after the engagement of the projections in the holes is deformed back and cooperates with a locking portion of the fuel flap so that the fuel flap is secured.

13 Claims, 2 Drawing Sheets

10 12 16 18 20 22 24 26

30 32 34 36 38 40 42 44 46 48 50 52 54 56 58 60

FUEL FLAP FOR AUTOMOBILES

RELATED APPLICATIONS

The present application is based on, and claims priority from German Application No. 10 2006 019 959.6, filed Apr. 28, 2006, the disclosure of which is hereby incorporated by reference herein in its entirety.

TECHNICAL FIELD

The disclosure is related to a fuel flap for automobiles.

BACKGROUND

Fuel flaps are usually mounted on the bodyshell of automobiles via a hinge and close the access to a filler neck for fuel, which is arranged in the interior of the bodyshell. In the opening position of the fuel flap, this access is permitted, in order to be able to perform filling of the tank via a dispenser gun. The outer surface of the fuel flap should be as smooth as possible and match the neighbouring bodyshell surfaces. The fuel flap usually consists of a plastic material, and when forming the fuel flap in a tool it has to be taken care that the outer surface of the fuel flap has the required quality. However, this is not always ensured.

It is known to form the fuel flap together with a hinge arm in one piece. However, it is also known to form hinge arm and fuel flap as separate pieces and to connect them with each other thereafter. For the connection, there are different possibilities. For instance, the fuel flap can be glued together with the hinge arm. Another possibility is to connect the fuel flap with the hinge arm via a screwed connection. Finally, there is the possibility to provide fuel flap and hinge arm with co-acting fastening means, with lock into place on the hinge arm when the fuel flap is assembled.

When forming the fastening means on the backside of the fuel flap, a certain accumulation of material is inevitable. However, such an accumulation of material results easily in a deterioration of the quality of the outer surface of the fuel flap.

SUMMARY

There is a need to provide a fuel flap for automobiles which can be produced by relatively simple tools and in which an unobjectionable visible surface is created.

In the fuel flap according to an embodiment of the present invention, the first fastening means on the backside of the fuel flap have at least two approximately parallel fastening ribs, from which at least one has two spaced holes and the other has at least one hole, with the axes of the holes being parallel. The ribs can run continuously, however, it is also conceivable to provide one rib portion for each hole. Furthermore, the axes of the holes run in a plane which is approximately parallel to that plane in which the fuel flap extends as a relatively flat assembly part. Mostly, the fuel flap is not completely planar, but more or less curved, corresponding to the outer contour of the neighbouring bodyshell surfaces.

The fastening means of the hinge arm include at least three projections having a cross-section complementary to that of the holes. It is conceivable to provide one fastening hole and an assigned fastening projection at a time with another cross-section than the other holes and projections. However, it is practical that all the projections have the same dimensions. Naturally, the same is then also valid for the fastening holes. Projections and fastening holes can engage in a positive fit. In the assembly, fuel flap and hinge arm are held with respect to each other such that the fastening holes are aligned to the fastening projections. A relative movement in the direction of the axes of the holes and the axes of the projections has the result that the projections engage into the holes. Through this, the fuel flap is positioned in two orthogonal directions, as well as in the insertion directions of the projections. In order to prevent moving out of the projections from the holes also, the invention provides a resilient portion.

At least one resilient portion is formed on the hinge arm, which upon engagement of the projection in the holes is temporarily deformed and after the engagement of the projections in the holes is somewhat deformed back and cooperates lockingly with a locking portion of the fuel flap, such that the fuel flap is secured also with respect to a third direction, which is orthogonal to the first and the second direction.

For this reason, the fuel flap must have only two ribs or rib portions, respectively, which can be realized as being flat according to one embodiment of the invention. As a consequence, the accumulation of material on the backside of the fuel flap is minimum. Thus, it is possible to form the visible surface of the fuel flap in a high quality, so that unevennesses or other irregularities do not occur. The assembly of the fuel flap on the hinge arm can take place without tools by simple hand movements. Nonetheless, the fuel flap is securely held on the hinge arm. The production of the fastening means on the fuel flap and on the hinge arm can be achieved in a relatively simple manner with respect to tool technique. Thus, the manufacture of the fuel flap according to an embodiment of the present invention is accompanied by relatively little expenditure.

According to one embodiment of the invention, the holes can have a circular, oval or polygonal or other form. As mentioned, the projections are formed in a complementary manner.

According to one embodiment of the invention, the projections of the hinge arm can be also formed on ribs.

In the above description and also in the following, it is always assumed that the fastening holes are formed on the fuel flap and the projections on the hinge arm. It is to be understood that the fastening holes can be also formed on ribs of the hinge arm and the projections on ribs of the fuel flap. From the kinematics point of view, this is a simple reversal, which according to circumstances can be less favourable with regard to tool technique as well as to the production the fuel flap for the purpose to achieve a visible surface of high quality, however.

In order to be able to remove the fuel flap from the hinge arm also, one embodiment of the invention provides that the resilient portion is accessible through a recess in the hinge arm in order to disengage it with the locking portion by means of a tool.

The course of the fastening ribs and the axes of the fastening holes and those of the projections are arranged such that setting up the holes on the projections of the hinge arm takes place approximately in a vertical direction. Thus, the fastening ribs extend approximately horizontally when the fuel flap is attached to the hinge arm and the latter on the bodyshell.

A further embodiment of the invention provides that the hinge arm has an outer elevated marginal portion which extends in a plane perpendicular to the axes of the projections, and that a resilient tongue is formed from the marginal portion. The fastening rib adjacent to the marginal portion is provided with a recess which accommodates the resilient tongue when the fuel flap is held against the hinge arm for assembly purposes. Resilient tongue and recess are formed such that the resilient tongue is moved out of the recess and lockingly engages the associated surface of the respective fastening rib, after the projections were at least partially inserted into the holes. In the marginal portion, an opening is preferably formed in the area of the resilient tongue, through which a tool can actuate the resilient tongue.

In one embodiment of the invention, for reasons of stability, it is practical to realize a portion of the hinge arm as being box-shaped with an elevated margin surrounding the box-shaped portion, the interior of the box-shaped portion being reinforced by ribs.

BRIEF DESCRIPTION OF THE DRAWINGS

One example of realisation of the invention is hereinafter explained in more detail by means of drawings.

DETAILED DESCRIPTION

Figure 1:
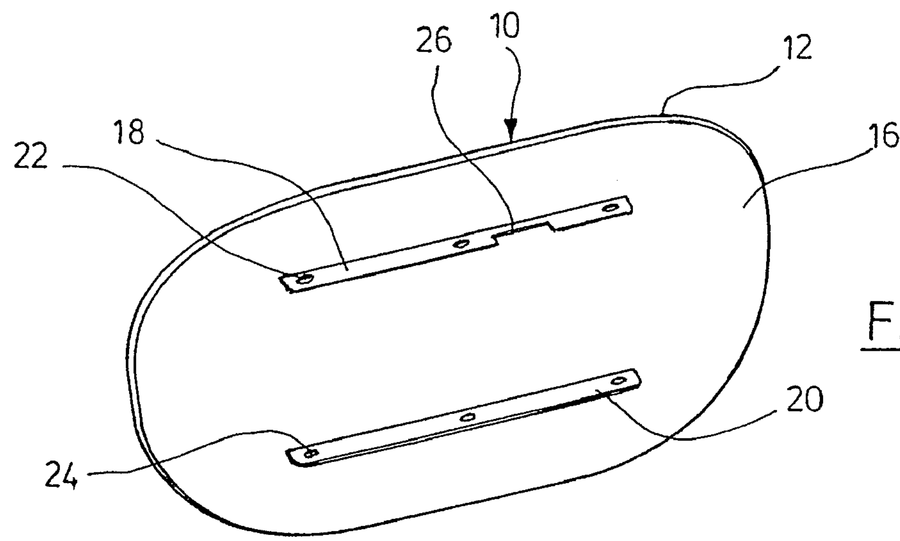
FIG. 1 shows in a perspective view a fuel flap according to an embodiment of the present invention, seen from its backside.
Figure 3:
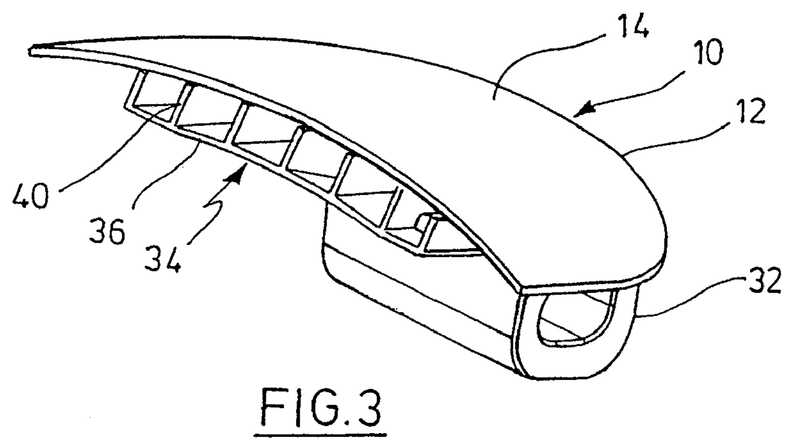
FIG. 3 shows in a perspective view a section through the assembled arrangement of fuel flap and hinge arm.

A fuel flap 10 according to FIG. 1 has a flat, somewhat shell-shaped body 12 with a visible surface 14 (FIG. 3) and a back surface 16 (FIG. 1). The body 12 of the fuel flap 10 is formed from a suitable plastic material.

On the back surface 16, two flat ribs 18, 20 running spaced apart from each other are formed, the plane of which is approximately orthogonal to the back surface 16. In the assembled condition of the fuel flap, the ribs 18, 20 are approximately horizontal. The ribs 18, 20 each have three spaced holes 22 or 24 at a time, respectively. The holes are circular, but can also have arbitrary other forms. In the upper rib 18, a rectangular recess 26 is formed.

Figure 2:
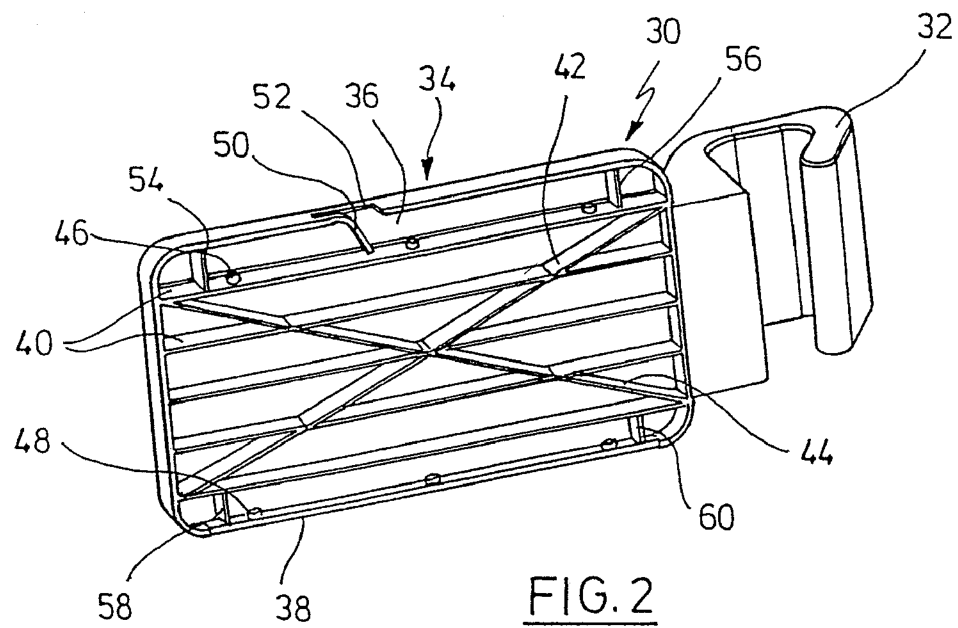
FIG. 2 shows in a perspective view a hinge arm with its front side, for attaching the fuel flap after FIG. 1.

A hinge arm 30 according to FIG. 2 has a hinge portion 32, for the purpose of mounting it on the bodyshell of a not shown automobile. Further, the hinge arm 30 has an arm portion 34. The arm portion is box-shaped with a continuous wall 36 and an outer margin, which extends along the outer edge of the wall 36. The margin 38 is approximately orthogonal to the wall 36. Parallel vertically spaced ribs 40 extend between vertical marginal portions and serve for stiffening the arm portion 34. The stiffening is supplemented by two diagonally extending ribs 42, 44. On the uppermost rib 40, three spaced bolt-shaped projections 46 are formed. Their axes extend vertically to the flat ribs 40 and parallel to the wall 36. At the lower marginal portion of the margin 38, three additional bolt-shaped projections 48 are formed, with axes vertical to the ribs 40 and to the margin 38. In the present case, upper and lower projections 46, 48 are arranged in pairs on top of each other, with axes directed towards each other. The cross section of the projections 46, 48 is such that they can engage with positive fit into the holes 22, 24 of the fuel flap 10.

In the upper marginal portion 38, a resilient tongue 50 is formed, which extends diagonally into the interior of the box-like arm 34 in the direction of the upper rib 40. Furthermore, the upper marginal portion 38 is provided with an opening 52 beside the resilient tongue 50. In this way, the resilient tongue 50 can be gripped by a tool.

In the assembly, the fuel flap 10 is turned about 180° and held against the arm portion 34 according to FIG. 2. In this, the fastening ribs 18, 20 are somewhat above the projections 46 or 48, respectively, and the recess 26 is in the region of the resilient tongue 50. The openings 22, 24 are aligned towards the projections 46, 48. In order to facilitate this alignment, diagonal ribs 54, 56 are formed between the upper portion of the margin 38 and the rib 40 positioned underneath. Similar diagonal ribs 58, 60 are formed between the lower portion of the margin 38 and the rib 40 above it. The portion of these diagonal ribs is such that the fastening ribs 18, 20 can be pushed between them in an approximately matching way.

After the holes 22, 24 have been aligned towards the projections 46, 48, the fuel flap 10 is moved downward with respect to the arm portion 34, through which the projections 46, 48 engage into the holes 22, 24, until the ribs 18, 20 abut on the upper rib 40 or the inner side of the lower portion of the margin 38, respectively. In this movement, the free end of the resilient tongue 50 slides out of the recess 26 of the upper fastening rib 18 and lockingly engages the upper side of the upper fastening rib 18. Through this, the fuel flap is prevented from being moved upward with respect to the arm portion 34. As a consequence, the fuel flap 10 is secured in all directions on the hinge arm 30.

Figure 4:
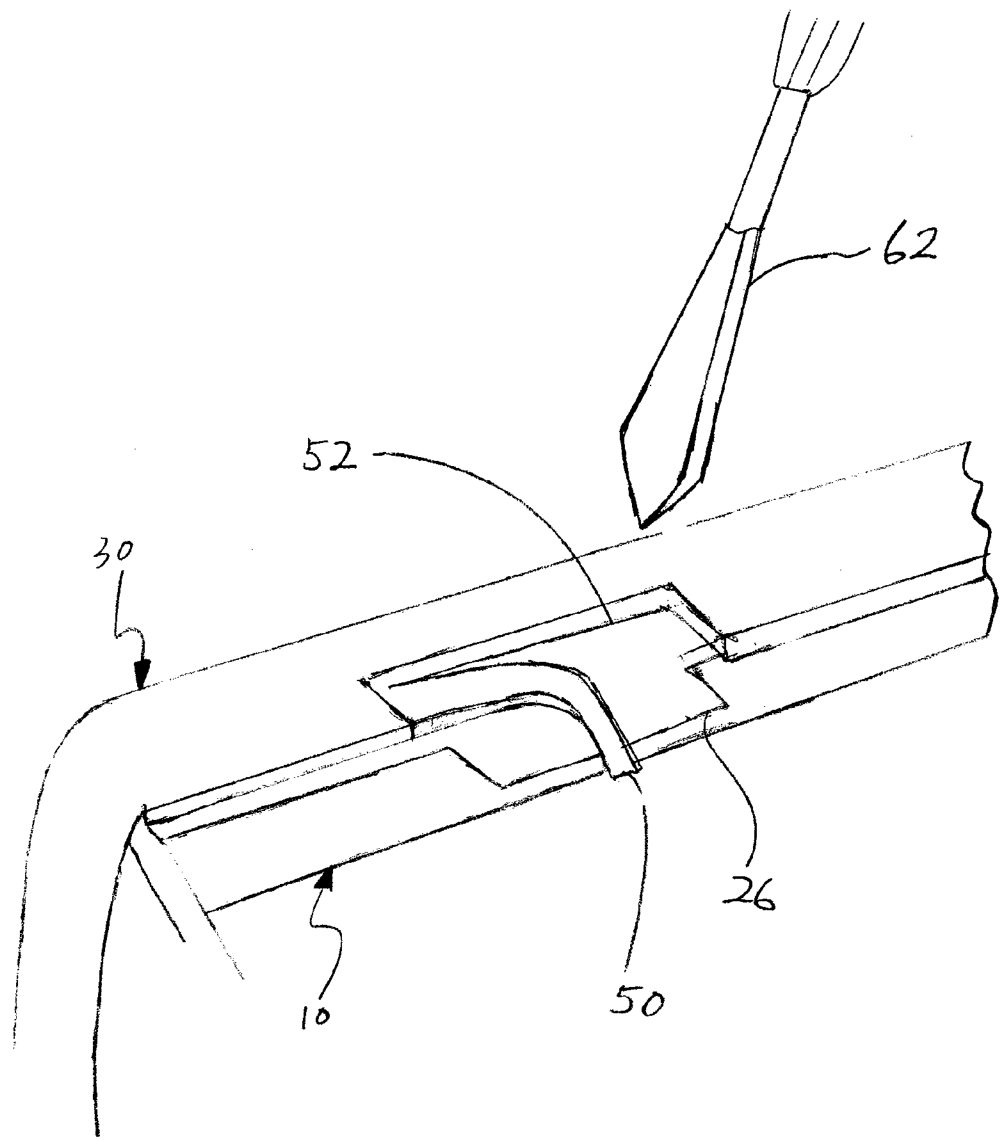
FIG. 4 is an enlarged, perspective view showing how a tool can disengage the fuel flap and the hinge arm.

In order to remove the fuel flap 10, the resilient tongue 50 has to be bent somewhat upward with the aid of a tool 62, which is inserted via the opening 52, so that the projections 46, 48 come out of engagement with the holes 22, 24 according to FIG. 4. Once this has happened, the fuel flap 10 can be removed from the arm portion 34.

The invention claimed is:

1. A fuel flap of plastic material for automobiles, comprising:

an outer visible surface and an inner surface, a first fastening element being formed at the inner surface for the attachment to a hinge arm, the hinge arm having a second fastening element on the side facing the fuel flap, the second fastening element co-acting with the first fastening element in order to attach the fuel flap to the hinge arm at a predetermined position, wherein the first fastening element includes at least two approximately parallel fastening ribs, at least one of the ribs having two spaced holes and the other has at least one hole, the axes of the holes being parallel, the second fastening element includes at least three projections having a cross-section complementary to that of the holes in order to provide a positive fit of the projections in the holes when the first and second fastening elements cooperate in order to position the fuel flap to the hinge arm with respect to first and second orthogonal directions, the axes of the projections being parallel so that upon assembly the holes can be aligned to the respective projections which upon a relative movement of fuel flap and hinge arm may engage each other in the plane of the axes, and a resilient portion is formed to the hinge arm which upon engagement of the projections in the respective holes is temporarily deformed and after the engagement of the projections in the holes is deformed back and cooperates with a locking portion of the fuel flap so that the fuel flap is secured also with respect to a third direction which is orthogonal to the first and second directions the hinge arm has an outer elevated marginal portion which extends in a plane perpendicular to the axes of the projections, the resilient portion is a resilient tongue formed from the marginal portion, the fastening rib adjacent to the marginal portion is provided with a recess which accommodates the resilient tongue when the fuel flap for assembly purposes is hold against the hinge arm, and the resilient tongue and the recess are formed such that the resilient tongue is moved out of the recess and lockingly engages a surface of the fastening rib when the projections are at least partially inserted into the respective holes.

2. The fuel flap of claim 1, wherein the holes are circular, oval or polygonal.

3. The fuel flap of claim 1, wherein the fuel flap has a flat body and the holes are formed in the fastening ribs which are approximately perpendicular to the flat body.

4. The fuel flap of claim 1, wherein at least one of the projections is formed to a reinforcing rib of the hinge arm.

5. The fuel flap of claim 1, wherein the marginal portion in the area of the resilient tongue has an opening through which a tool can disengage the resilient tongue from the recess on the fastening rib.

6. The fuel flap of claim 1, wherein the hinge arm has a box-shaped portion with an elevated margin surrounding the box-shaped portion and the interior of the box-shaped portion is reinforced by reinforcing ribs.

7. The fuel flap of claim 1, wherein at least one projection is formed to the inner side of the marginal portion.

8. An automobile fuel flap, comprising:

a flap body having an outer side adapted to be visible on an outer bodyshell of an automobile when the fuel flap is mounted on the automobile, and an inner side opposite to the outer side, a hinge arm having a hinge portion for rotatably mounting the fuel flap on the automobile, and an arm portion for mounting the flap body thereon, a resilient portion formed on one of the arm portion and the flap body, a first fastening element formed on the inner side of the flap body, and a second fastening element formed on the arm portion of the hinge arm, and engageable with the first fastening element in order to position the flap body to the hinge arm, wherein one of the first and second fastening elements comprises at least one projection and the other of the first and second fastening elements comprises at least one hole for receiving the projection when said projection is inserted, in an insertion direction that is axial of said hole, into said hole; and the resilient portion is adapted to deform upon an initial insertion of the projection into the hole and, after a further insertion of the projection into the hole, to return toward a undeformed state to engage the other of the arm portion and the flap body, and urge the other of the arm portion and the flap body against said one of the arm portion and the flap body in the insertion direction.

9. The fuel flap of claim 8, wherein the resilient portion is accessible from outside through a recess in the arm portion in order to disengage the resilient portion from the other of the arm portion and the flap body by means of a tool.

10. The fuel flap of claim 8, wherein the arm portion has an outer elevated marginal portion, the resilient portion is a resilient tongue formed from the marginal portion to define on said marginal portion a first recess, the flap body has, on the inner side thereof, a fastening rib which is adjacent to the marginal portion when the flap body is attached to the arm portion, said fastening rib comprises a second recess through which the resilient tongue extends when the flap body is positioned on the arm portion with the projection being aligned, prior to insertion, with the respective hole, and the resilient tongue and the second recess are formed such that, upon the initial insertion of the projection into the hole, the resilient tongue is deformed by the fastening rib around the second recess, and after the further insertion of the projection into the hole, the resilient tongue is moved out of the second recess, returns toward the undeformed state, and engages a surface of the fastening rib to urge the flap body against the arm portion.

11. The fuel flap of claim 10, wherein the resilient tongue is accessible from outside through the first recess in order to disengage the resilient tongue from the fastening rib by means of a tool.

12. The fuel flap of claim 10, wherein the arm portion has at least one reinforcing rib that comprises one of the projection and the hole, and the fastening rib of the flap body comprises, in addition to the second recess, the other of the projection and the hole.

13. The fuel flap of claim 8, wherein the flap body is generally flat; and an axial direction of the hole as well as the insertion direction are substantially parallel to a plane of said generally flat flap body.

* * * * *